United States Patent
Mooney

(10) Patent No.: US 11,118,723 B2
(45) Date of Patent: Sep. 14, 2021

(54) MOUNTING PLATE FOR COMPUTER

(71) Applicant: Chicago Maritme Supply, LLC, Chicago, IL (US)

(72) Inventor: William M Mooney, Chicago, IL (US)

(73) Assignee: Chicago Maritme Supply, LLC, Chicago, IL (US)

( * ) Notice: Subject to any disclaimer, the term of this patent is extended or adjusted under 35 U.S.C. 154(b) by 0 days.

(21) Appl. No.: 16/882,470

(22) Filed: May 23, 2020

(65) Prior Publication Data
US 2020/0370704 A1 Nov. 26, 2020

Related U.S. Application Data

(60) Provisional application No. 62/852,457, filed on May 24, 2019.

(51) Int. Cl.
*F16M 11/14* (2006.01)
*F16M 13/02* (2006.01)

(52) U.S. Cl.
CPC .......... *F16M 11/14* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,991,966 A * | 11/1976 | Breer, II | ............. | A47B 23/002 248/444 |
| 6,213,439 B1 * | 4/2001 | Giulie | .................... | A47B 97/04 248/459 |
| 7,333,327 B1 * | 2/2008 | Ho | ...................... | A47B 21/0314 206/320 |
| 7,686,250 B2 * | 3/2010 | Fortes | ................... | F16M 11/14 244/129.1 |
| 8,231,081 B2 * | 7/2012 | Fortes | ................... | B64D 43/00 244/129.1 |
| 8,308,114 B2 * | 11/2012 | DeBuhr | ................ | F16M 11/14 248/188.1 |
| 8,638,548 B2 * | 1/2014 | Gardes | .................... | H04N 5/64 361/679.23 |
| 8,727,290 B1 * | 5/2014 | De La Matta | ........ | F16M 13/00 248/160 |
| 8,827,226 B2 * | 9/2014 | Townsend | .......... | F16M 11/2014 248/323 |
| 9,027,892 B2 * | 5/2015 | Boer | .................... | B60R 11/0235 248/222.52 |
| 2002/0003197 A1 * | 1/2002 | MacEachern | ...... | F16M 11/2014 248/346.01 |
| 2007/0057133 A1 * | 3/2007 | Cottingham | ........... | F16M 13/02 248/309.1 |
| 2008/0251680 A1 * | 10/2008 | Matias | ................. | A47B 23/043 248/454 |
| 2011/0031373 A1 * | 2/2011 | Fortes | .................... | F16M 11/14 248/600 |
| 2011/0089296 A1 * | 4/2011 | Joanisse | ................ | F16M 13/00 248/181.1 |
| 2014/0130334 A1 * | 5/2014 | Chun | ..................... | F16M 13/00 29/525.01 |

* cited by examiner

*Primary Examiner* — Monica E Millner

(57) ABSTRACT

A mounting plate includes arrays of indents and slots to receive brackets to hold a tablet computer on the plate with a connector projecting rearwardly to interconnect a ball and socket joint, providing substantially universal accommodation of common sized tablet computers for mounting, in particular, on a moving vehicle.

12 Claims, 3 Drawing Sheets

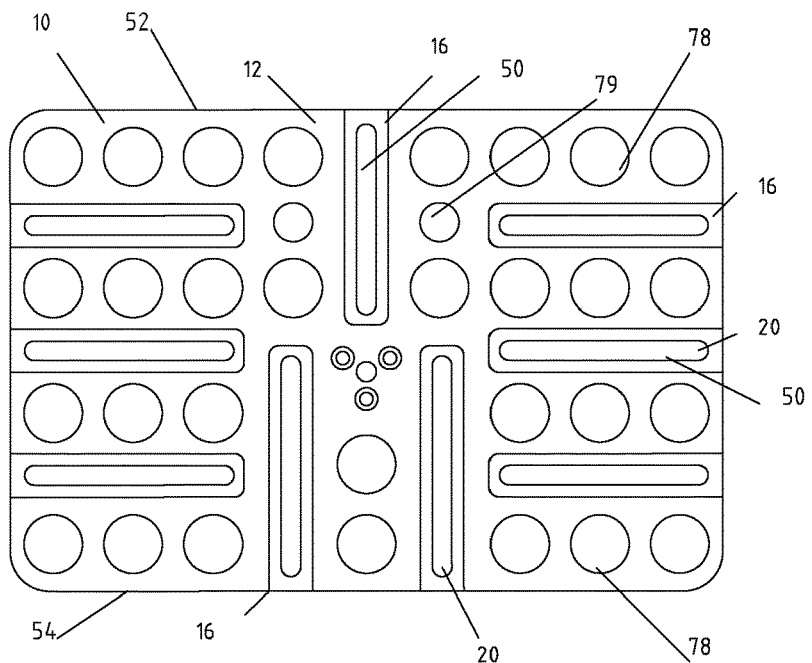
Fig. 1
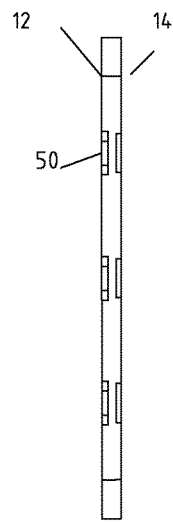
Fig. 2
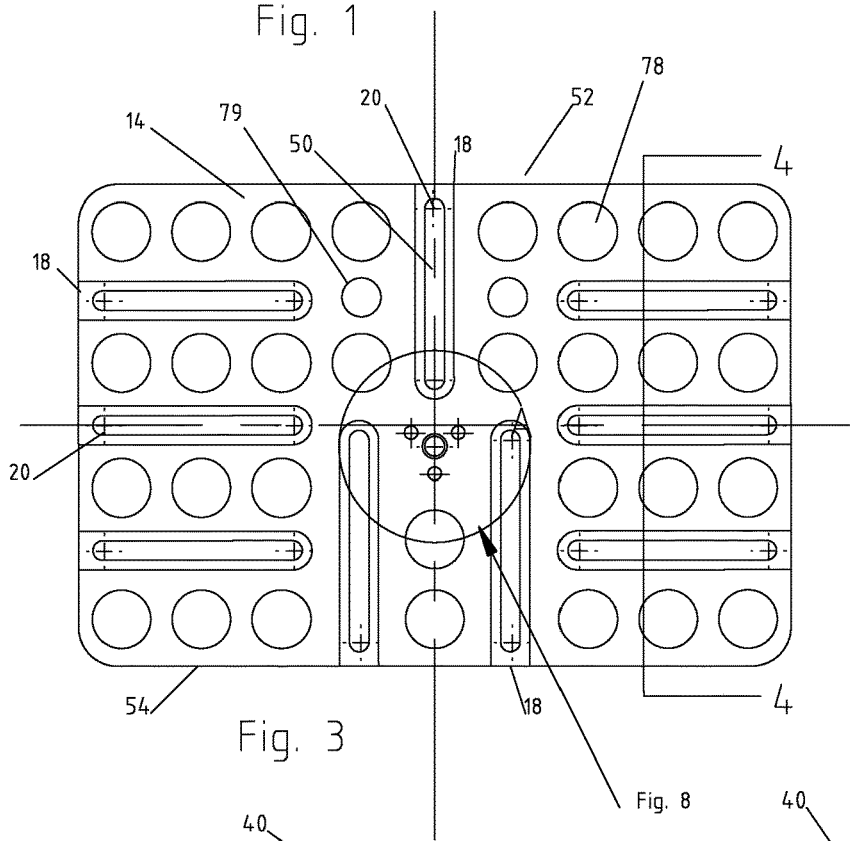
Fig. 3
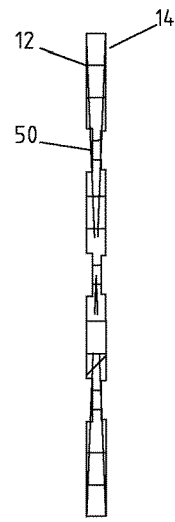
Fig. 4
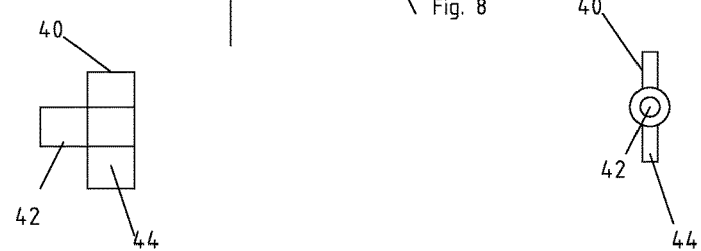
Fig. 5
Fig. 6

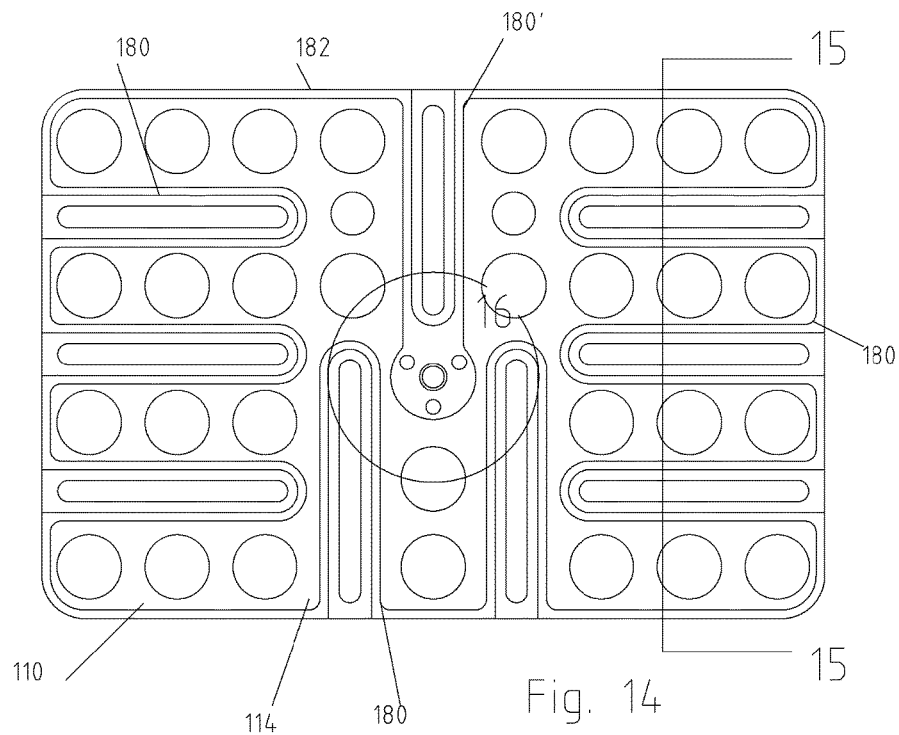
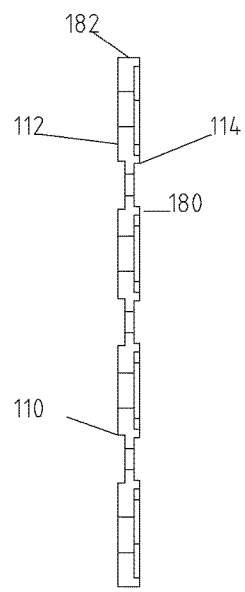
Fig. 14      Fig. 15
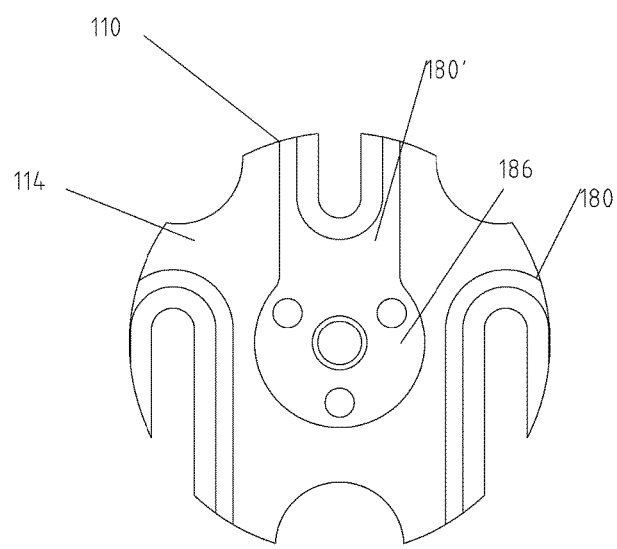
Fig. 16

MOUNTING PLATE FOR COMPUTER

CLAIM OF PRIORITY

This application claims priority on Provisional Application Ser. No. 62/852,457 filed May 24, 2019 and having the same inventor and title as the present application.

FIELD OF THE INVENTION

The present invention relates to a mounting apparatus for computers and more particularly to a mounting plate, ball joint and clamp arrangement for use in securing and positioning electronic devices such as computers in an environment where they are exposed to environmental factors including motion and weather.

BACKGROUND

The present invention relates generally to mounting apparatus for computers and more particularly to a mounting plate, ball joint and clamp arrangement adapted to secure a computer, such as a tablet computer, telephone or other personal device to a fixed base on a vehicle with an articulated connector, the plate being adapted to have a plurality of apertures and slots in an array optimized for securement of a wide array of physical dimensions for the computers, including computers themselves enclosed in weather resistant containers.

SUMMARY OF THE INVENTION

Description of Related Art

The prior art plate generally uses a constant thickness plate, which may be molded or cast, but could also include stamped sheet material, in which the web is displaced downwardly to create recesses to form a top indent, but because it is of substantially constant thickness, so the nuts just bear on the bottom surface. Within the top indent is cut or formed a slot adapted to receive studs on brackets. Relative to the plate, if the plate were horizontal, the recess and slot are, in section, generally a letter "T" shape.

The prior art brackets, similarly, could be molded or cast, or formed sheet material or bar, or otherwise formed as a constant thickness body.

Prior art brackets are held on the prior art plates with thumb nuts having gripping portions to manually tighten or loosen and having extended cylindrical portions ending in flats that bear on the bottom of the plate.

The alignment of brackets in the prior art is limited by the array of slots and their geometry, which also can be disadvantageous when aligning nuts in a difficult environment such as a boat that is moving, wet, and requiring the operator to reach behind the plate, sometimes blindly. The arrays for slots in the prior art provide fewer practical options for real world tablet computers or other devices when compared to this disclosure.

BRIEF DESCRIPTION

The mounting apparatus disclosed herein uses a solid plate having parallel front and rear surfaces which are relieved to provide perpendicular ended recesses in the front and semicircular ended indents on the rear interconnected by a slot which accomplish guiding and supporting brackets on the front while also guiding and supporting thumb nuts on the rear. In section relative to the front and rear surfaces, if the plate were vertical, the recess, slot and indent configuration is generally a capital letter "H" shape, although the legs might vary in height.

The brackets provide mechanical engagement with the computer or computer case while permitting movement to optimize that engagement, adjust position or to provide ease of removal. In keeping an angled arm urges the computer or computer case in contact with the front surface and a lip minimizes disengagement and may provide added grip such as on a resilient computer case.

The ball connector provides a substantially spherical surface to engage a ball joint and is formed and arranged to use prior art joints. The plate provides countersunk mounting holes in the front face which pass through the plate and align with corresponding mounting holes on the base of the ball, while the rear surface is recessed to receive a projecting spindle forwardly projecting from the base of the ball, providing added security and ease of alignment when fitting the ball in place.

The mount will allow a user to use a tablet PC anywhere, particularly on a movable vehicle such as a boat, but industrial or tactical situations might also be advantageously met by the mount. For example, a user may connect a tablet computer to a NMEA network and have access to data at the helm, or the tablet computer, using the mount, could be located proximate a berth for monitoring away from the helm, such as during long passages.

The plate described, in combination with the brackets and connector, provides a modular design. The mounting arrangement may lock a tablet computer rigidly in place using a minimum of hardware. The slot arrays and brackets allows the convenience of mounting, for example, any size iPad on the market at the date of invention with size adaptations permitted by the slot arrangements. Additionally, the brackets permit accommodation of varied thicknesses of waterproof case up to 1.25" thick even when used to mount an iPad 12.9. The slot and bracket arrays permit adaptation to other tablet computers without restriction to operating system and the bracket locations may be adjusted to permit ports such as for communication, power, and peripherals, to be exposed as needed. Thus the plate and bracket arrangement is compatible with nearly every available water proof tablet case in use at the time of invention. The preferred brackets will accommodate any waterproof case up to 1.25" thickness. Lower profile clips may be provided for tablets under 10". The large indented slide areas allow brackets to adjust outward or inward to accommodate any size tablet or case with walls permitting retention in place during adjustment.

The brackets are constructed with threaded studs inserted through slots in the plate and secured on the other side by thumb nuts that allow a user to adjust the tension around a user's computer or tablet.

In addition, plate is designed to operate with multiple size brackets as some brackets may be more suitable for a user's particular use without a case and vice versa as designed. The preferred brackets will work with any Apple product tablet ranging from the iPad mini to the iPad 12.9 and other tablets and computers of similar size without reference to manufacturer or operating system.

To use the mount all a user needs to do is choose the correct brackets for the user's application and insert the threaded studs in the locations suitable for a user's tablet (without blocking charge ports or control buttons). The user will then secure the threaded nuts to the backside. Then the user's tablet (inside the case if a user plan to use a case) may be placed firmly, backside toward the flat front surface of the plate. The tablet and mount may be turned upside down and the brackets slid in place firmly at the tablet edges. Then the brackets may be secured using the preferred thumb nuts. The combination of recess, slot and indent—in combination, aperture—facilitates manual connection with the plate oriented so that one side is blind—the user can align the bracket or nut in the respective recess or indent the mechanical orientation facilitating connection because relative location is controlled so as to have only one variable axis.

The plate comes in two different styles ultralight and heavy duty. Either plate is also available in composite construction suitable for racing boats where weight-savings is a consideration. The thicker version of the plate consists of a single piece block plate design with indents for brackets. The thinner plate consists of additional milled areas on the backside that will reduce the weight of the tablet plate by a specified amount. The operation of all plates is identical.

Connecting the plate to the ball connector uses a high strength connection using three bolts centered around an aluminum spindle of solid 6061T6 aluminum ball preferably anodized for corrosion resistance. Stainless steel has strength and corrosion resistance itself but has weight and dissimilar metal disadvantages is used with aluminum. Aluminum bolts may be preferred or suitable tough composites may be used. The ball joint is grooved to provide additional security when the plate is in the seaway or high vibration environment.

The invention will be better understood and aspects other than those set forth above will become apparent when consideration is given to the following detailed description thereof. Such description makes reference to the annexed drawings discussed below.

BRIEF DESCRIPTION OF THE DRAWINGS

FIG. 1 is a front elevational view of a mounting plate of the invention.

FIG. 2 is a side elevational view of a mounting plate of the invention.

FIG. 3 is a rear elevational view of a mounting plate of the invention.

FIG. 4 is a sectional view of a mounting plate of the invention.

FIG. 5 is a side elevational view of the thumb nut of the invention.

FIG. 6 is an end elevational view of the thumb nut of the invention.

FIG. 14 is a rear elevational view of an alternative mounting plate of the invention.

FIG. 15 is a sectional view of an alternative mounting plate of the invention.

FIG. 16 is an enlarged view of the ball connector location on an alternative mounting plate of the invention.

DETAILED DESCRIPTION OF THE PREFERRED EMBODIMENT

Figure 12:
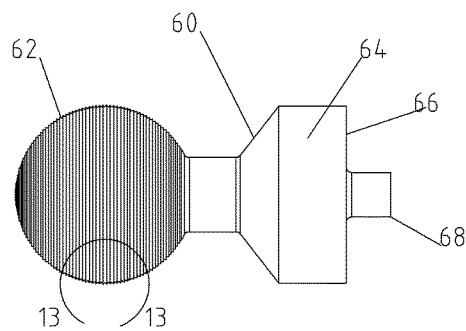
FIG. 12 is an elevational view of the ball connector of the invention.
Figure 7:
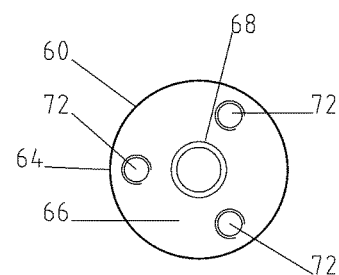
FIG. 7 is an end view of the ball connector of the invention.
Figure 13:
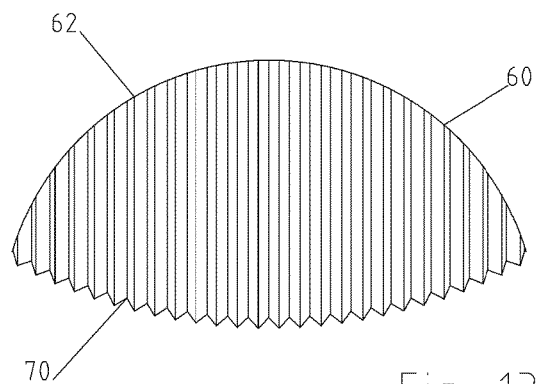
FIG. 13 is an enlarged view of the ball connector of the invention.
Figure 9:
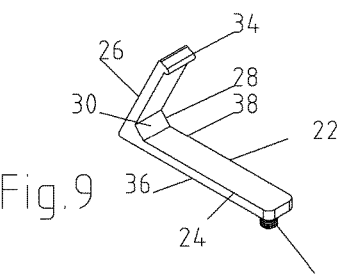
FIG. 9 is a perspective view of the bracket of the invention.
Figure 10:
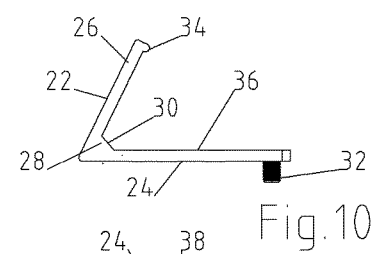
FIG. 10 is an elevational view of the bracket of the invention.
Figure 11:
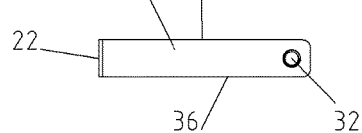
FIG. 11 is bottom plan view of the bracket of the invention.
Figure 8:
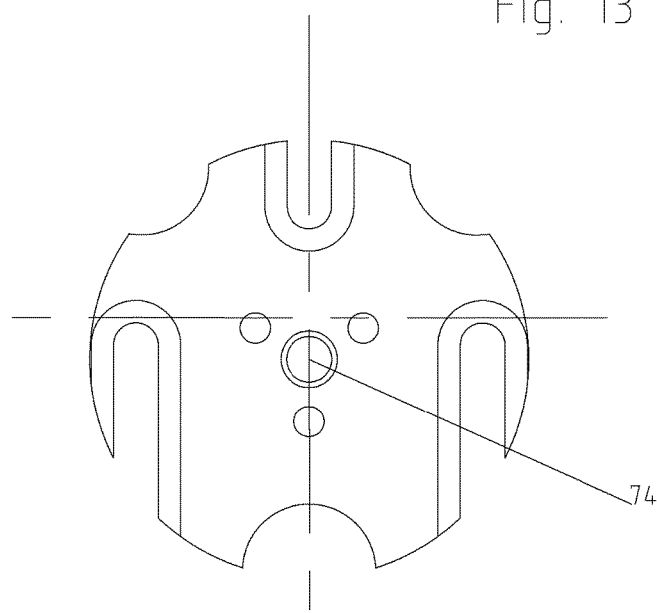
FIG. 8 is an enlarged view of the ball connector location on the plate of the invention.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. Accordingly, the detailed discussion herein of one or more embodiments is not intended, nor is to be construed, to limit the metes and bounds of the patent protection afforded the present invention, in which the scope of patent protection is intended to be defined by the claims and their equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention. Further yet, the drawings are not necessarily to scale and in some instances proportions may have been exaggerated in order to more clearly depict certain features of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

The plate 10 has a front 12 and rear 14 surface formed and arranged to define opposed perpendicular ended recesses 16 and semicircularly ended indents 18 interconnected by slots 20.

Brackets 22 have a base leg 24 and an angled arm 26 projecting therefrom. The projection is at an angle of about sixty degrees (60°) although sixty four degrees (64°) may be preferred. Accordingly a variation of about four degrees (4°)—less than five degrees (5°)—would be functional. An interior bevel 28 at the apex of the arm and leg has a face 30 at an angle of about sixty seven degrees (67°) to the horizontal leg provides addition strength at the apex. Stud 32 projects downwardly from leg 24 proximate the end opposite the apex. At the tip of the arm 26 is a lip 34 that projects generally perpendicularly relative to the leg 24 that could provide either mechanical retention of a computer or case, or increased pressure such as against a resilient case containing a computer. The bracket 22 has predetermined width defined between sides 36, 38.

Brackets 22 are retained by thumb nuts 40 having projecting cylinders 42 and grips 44 as shown in FIG. 5 and FIG. 6. Other fasteners could be used commensurate with the circumstances, for example, semi-permanent mounting could use standard nuts and thumb nuts could have knurling or other surface treatment. Tapping the brackets and using bolts would not have the alignment advantages discussed below.

The recesses 16, 18 and slots 20 form a "stepped" section—generally an "H" shape when the plate is vertical, to define apertures 50 which have the properties: (1) the sides 36, 38 of the bracket 22 at the front, wider, perpendicular ended recesses 16; (2) the stud 32 fits in the slots 20; (3) the nuts 40 are hand tightenable and have cylinders 42 fit in the rear semicircularly ended indents 18.

On the plate are arrays of apertures 50 for receipt of brackets 22. Horizontal arrays are left and right sets of three horizontal slots, center, top and bottom. The horizontal arrays are vertically symmetric, in that the center apertures are generally on the horizontal centerline of the plate and the top and bottom are equally spaced above and below and generally half the distance between the centerline and the top and bottom edges 52, 54. In a preferred embodiment, these distances may be 1.5 inches and 1.9 inches, respectively.

Vertical apertures 50 are arrayed with one at the top and two at the bottom. The left and right apertures 50 at the bottom extend vertically from near the horizontal centerline to near the top edge. In a preferred embodiment this is generally about three inches, but stopping short of the top edge a dimension generally equal to the width of the slot 20. The left and right apertures 50 are spaced generally one inch left and right of the vertical centerline of the plate. Having two apertures 50 to retain two brackets 22 supports a computer or other device in the mounting apparatus. These features are adaptable to provide mounting capability for various other electronic devices like radios, sonar, battery packs, GPS and chartplotters as well as appropriate battery packs, and compliant monitors utilizing different combinations of round holes with mounting hardware consisting of screws and washers. Video Electronics Standards Association standards for mounting VESA 100×100 and 100×200 are incorporated by reference as if fully set forth herein.

On the vertical centerline of the plate is the top vertical aperture. The top vertical aperture 50 extends from generally two and one half inches from the top edge 52 to a distance from the top edge 52 generally equal to the width of the slot 20.

Notably, the top vertical apertures and bottom vertical apertures are of slightly different lengths which can provide better adjustment to support the computer against the effect of gravity.

The plate is mountable to a connection, such as a ball connector 60 for a ball and socket joint, or other suitable mount, such as a gimbal or pivot for a interconnecting member to support the plate at one end and to be fixed to a clamp at a fixed end, such as being fixed to a boat. An example in the prior art is taught in expired U.S. Pat. No. 5,845,885 which is incorporated by reference as if fully set forth herein. Devices with their own mounting studs may be mounted advantageously using the advantages of alignment of slots 20 and indents 18 with nuts 40 or indents and slots may be used for mounting bolt alignment.

The connector 60 has a spherical head 62 and a base 64. Base 64 has a bottom surface 66 and a projecting spindle 68. In the high friction, machined embodiment, the surface of head 62 is formed with an array of grooves 70 which may be formed of intersecting surfaces aligned at an angle of about ninety degrees (90°) to one another. Grooves 70 could also be formed with radii in the valleys. Grooves 70 provide increased friction in a ball and socket joint. Base 64 is formed to have fastener receptacles 72.

Plate 10 has a ball mount hole 74 slightly below the horizontal centerline of plate, about the same distance as the width of slot 20. Surrounding hole 74 are fastener holes 76 aligned evenly around ball mount hole 74 and positioned to align with receptacles 72.

Finally, the plate has arrays of round holes 78 three quarters of one inch to (0.75" ID) and 79 one half of one inch (0.5" ID) that are adapted to lighten the plate 10 with minimal reduction in needed strength. These may also provide, in some instances, places to attach elastic, strap or fiber lanyards, such as when the computer is mounted on a moving vehicle and a selected position and orientation is desired to be maintained.

In an alternative embodiment, plate 110 is formed with front 112 and rear 114 surfaces further relieved to provide additional bodies 180 while providing thinner web 182 surrounding bodies 180 thereby retaining thickness surrounding indents 118 and thicker edges 184. The interior, thicker, material permits the functions described above, while the thinner web 182 provides reduced weight and material. Top, center, vertical indent body 180' merges with a connector body 186 that receives base 64.

The preferred materials are 6061 T6 aluminum chosen for its low corrosion high strength properties. The aluminum may be anodized to appropriate specification to minimize corrosion. Other material may be used advantageously such as composites and/or high strength ultraviolet stable plastics.

There have thus been outlined, rather broadly, the more important features of the invention in order that the detailed description thereof that follows may be better understood, and in order that the present contribution of the art may be better appreciated.

Numerous aspects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The construction and arrangements of the mounting plate, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or other varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. As to the manner of usage and operation of the present invention, the same should be apparent from the above description. Accordingly, no further discussion relating to the manner of usage and operation will be provided.

While a number of exemplary embodiments of the mounting plate have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In accordance with my invention, I claim:

1. A mounting apparatus for an electronic device, said mounting apparatus comprising a plate and brackets, said plate having a body with parallel front and rear surfaces which are relieved to provide slots, each slot comprising perpendicular ended recesses in association with the front surface and semicircular ended indents associated with the rear surface, said front surface recesses and said rear surface indents being in communication with one another with a penetrating slot so as to permit passage of bracket mounting studs through said body;
   said slots are adapted to guide and support brackets within said front surface recesses and also adapted to guide and support mounting studs and thumb nuts within said rear indents;
   said brackets being formed and arranged to enable mechanical engagement with said device while permitting movement to optimize that engagement by position adjustment or to provide ease of removal of said device;
   said recesses allow said brackets to adjust outward or inward to accommodate devices of selected size while enabling location control during adjustment;
   said brackets each further comprising an angled arm formed and arranged to urge said device in contact with said front surface;
   said angled arm terminating in a lip projecting inwardly being adapted to minimize disengagement of said device and said lip further being adapted to provide added grip;
   said brackets are constructed with threaded studs inserted through said slots from front to rear and adjustably secured by thumb nuts that enable a user to adjust the tension imparted by said arms around said device when such a device is fitted;
   the combination of recesses and indents enables ease of installation of brackets when one of said brackets or one of said nuts is retained on a blind side of the plate, while the opposite of said nut or bracket is initially in contact with the other side of the plate;
   the combination of recesses and indents enables substantial loosening of said nuts, movement of brackets, and retightening of nuts while both the bracket and nut remain captured within the respective recess and indent;
   said apparatus being fitted with a ball connector adapted to be mounted on said rear surface with a ball connector base;
   said connector providing a substantially spherical surface adapted to engage a ball joint;
   said plate has countersunk connector mounting holes that penetrate the front surface, body and rear surface which align with corresponding mounting holes on said ball connector base;
   said rear surface is recessed to receive a projecting spindle forwardly projecting from the base of said connector, so as to provide added security and ease of alignment when fitting said connector in place;
   said ball connector is attached to said plate with a plurality of fasteners centered around an aluminum spindle which spindle is adapted to fit a hole in said plate.

2. The mounting apparatus of claim 1 further comprising:
   said front surface is beveled in decreasing thickness from edge to center so as to reduce mass;
   said rear surface is beveled in decreasing thickness from edge to center so as to reduce mass.

3. The mounting apparatus of claim 1 further comprising:
   said ball joint is grooved deeply to provide additional friction when the plate is in a dynamic environment.

4. The mounting apparatus of claim 1 further comprising:
   each of said brackets has a base leg with said angled arm projecting therefrom at an apex with an angle of between fifty five and sixty five degrees (55°-65°);
   each of said brackets is formed to have an interior bevel at the apex of the arm and leg having a face at an angle of between sixty two and seventy three degrees (62°-73°) to the leg;
   each of said brackets further has a fastener which projects downwardly from said leg proximate the end of said leg opposite the apex;
   each of said brackets further having, proximate a tip of said angled arm, a lip that projects generally parallel to said leg;
   each of said brackets has a predetermined width defined between bracket sides which width corresponds to a clearance between the respective bracket sides and walls of said recesses sufficient to that needed to slidably mount said brackets in said recesses;
   each of said brackets are further arranged to be retained by thumb nuts having projecting cylinders, said cylinders having diameters, and grips, said cylinder diameters correspond to the clearance needed to slidably mount in said indent.

5. A mounting apparatus comprising a plate to receive brackets, said plate having a front and rear surface formed and arranged to define opposed perpendicular ended recesses and semicircularly ended indents interconnected by slots so that in section the recesses, slots and indents defining an aperture stepped so as to generally present an "H" sectional shape;
   a plurality of opposed apertures are adapted to receive a plurality of brackets on said mounting apparatus;
   each of said brackets has a base leg and an angled arm projecting therefrom at an apex at an angle of between fifty five and sixty five degrees (55°-65°);
   each of said brackets is formed to have an interior bevel at the apex of the arm and leg having a face at an angle of between sixty two and seventy three degrees (62°-73°) to the horizontal leg;

each of said brackets further has a fastener which projects downwardly from said leg proximate the end of said leg opposite the apex;

each of said brackets further having proximate the tip of the arm a lip that projects generally perpendicularly relative to the leg;

each of said brackets has a predetermined width defined between bracket sides which width corresponds to the clearance needed to slidably mount said brackets in said recesses;

each of said brackets is further arranged to be retained by thumb nuts having projecting cylinders and grips, said cylinder diameters correspond to the clearance needed to slidably mount in said indents;

said plate is formed so as to have a plurality of arrays of apertures for receipt of said brackets including horizontal arrays in left and right sets of three horizontal apertures, center, top and bottom;

said horizontal arrays are vertically symmetric, in that the center apertures are generally on the horizontal centerline of the plate and the top and bottom are equally spaced above and below and generally half the distance between the centerline and the top and bottom edges;

vertical apertures are arrayed with one at the top and two at the bottom of said plate;

left and right apertures at the bottom extend vertically from near the horizontal centerline to near the top edge, but stopping short of the top edge a dimension generally equal to the width of the slot; said left and right bottom vertical apertures are spaced a selected distance from the vertical centerline of the plate;

said left and right bottom apertures being adapted to receive two brackets;

a top vertical aperture on the vertical centerline of the plate between the center of the plate and the top edge of the plate is spaced a distance from the top edge generally equal to the width of the slot;

said top vertical slot and said bottom vertical slots are of different lengths, the top vertical slot being relatively shorter and the bottom vertical slots being relatively longer;

said plate is mountable to a ball connector for a ball and socket joint adapted to receive a mechanism to support the plate at a free end and to be fixed to a clamp at a fixed end;

said ball connector has a spherical head and a mounting base;

said mounting base has a bottom surface and a projecting spindle;

a surface of said head is formed with an array of grooves formed of intersecting surfaces aligned at an angle of between eighty five and ninety five degrees (85°-95°) to one another;

said mounting base is formed to have fastener receptacles;

said plate has a ball mount hole slightly below the horizontal centerline of said plate, spaced about the same distance as the width of said slot;

said ball mount hole in said plate is formed and arranged to receive said connector;

surrounding said hole are fastener holes aligned evenly around said ball mount hole and positioned to align with said receptacles.

6. The invention of claim 5 further comprising:

said plate has arrays of round holes adapted to lighten the plate with minimal reduction in needed strength and also provide places to attach a securement member.

7. The invention of claim 5 further comprising:

said plate is formed with tapered front and tapered rear surfaces further relieved to recess and indent boundary bodies while providing a thinner web surrounding said bodies thereby retaining thickness surrounding indents and thicker edges;

said top, center, vertical indent body merges with a connector body that receives a ball connector base.

8. A mounting apparatus comprising a plate with a front and rear surface formed and arranged to define opposed perpendicular ended recesses and semicircularly ended indents interconnected by slots so that in section the recesses, slots and indents defining an aperture stepped so as to generally present an "H" sectional shape;

a plurality of opposed apertures are adapted to receive a plurality of brackets;

each of said brackets has a base leg and an angled arm projecting therefrom at an apex at an angle of between fifty five and sixty five degrees (55°-65°);

each of said brackets is formed to have an interior bevel at the apex of the arm and leg having a face at an angle of between sixty two and seventy three degrees (62°-73°) to the leg;

each of said brackets further has a fastener which projects downwardly from each of said legs proximate the end of said leg opposite the apex;

each of said brackets further having, proximate a tip of each respective arm, a lip that projects generally perpendicularly relative to said arm;

each of said brackets has a predetermined width defined between bracket sides which width so as to slidably mount each of said brackets in a corresponding one of said recesses;

each of said brackets further arranged to be retained by thumb nuts having projecting cylinders and grips, said cylinders having diameters correspond to the clearance between the respective cylinders and the corresponding indent that is needed to slidably mount in said indents.

9. The mounting apparatus of claim 8 further comprising:

said plate is formed so as to have a plurality of arrays of apertures for receipt of said brackets including horizontal arrays in left and right sets of three horizontal apertures, center, top and bottom, said plate further having top and bottom edges;

said horizontal arrays are vertically symmetric, in that the center apertures are generally on a horizontal centerline of the plate and the top and bottom are equally spaced above and below intermediate the centerline and the top and bottom edges;

vertical apertures are arrayed with one at the top and two at the bottom of said plate;

left and right apertures at the bottom extend vertically from near the horizontal centerline to near the top edge, but stopping short of the top edge a dimension generally equal to the width of the slot; said left and right bottom vertical apertures are spaced a selected distance from a vertical centerline of the plate;

said left and right bottom apertures being adapted to receive two brackets;

a top vertical aperture on the vertical centerline of the plate between the center of the plate and the top edge of the plate is spaced a distance from the top edge generally equal to the width of the slot;

said top vertical slot and said bottom vertical slots are of different lengths, the top vertical slot being relatively shorter and the bottom vertical slots being relatively longer.

10. The invention of claim 8 further comprising:

said plate is mountable to a ball connector for a ball and socket joint adapted to receive a mechanism to support the plate at one end and to be fixed to a clamp at a fixed end;

said ball connector has a spherical head and a base;

said base has a bottom surface and a projecting spindle;

a surface of said head is formed with an array of grooves formed of intersecting surfaces aligned at an angle of between eighty five and ninety five degrees (85°-95°) to one another;

said base is formed to have fastener receptacles;

said plate has a ball mount hole slightly below the horizontal centerline of said plate, spaced about the same distance as the width of said slot;

said ball mount hole is formed and arranged to receive said spindle;

surrounding said hole are fastener holes aligned evenly around said ball mount hole and positioned to align with said receptacles.

11. The invention of claim 8 further comprising:

said plate has arrays of round holes adapted to lighten the plate with minimal reduction in needed strength and also provide places to attach a securement member.

12. The invention of claim 8 further comprising:

said plate is formed with tapered front and tapered rear surfaces further relieved to recess and indent boundary bodies while providing a thinner web surrounding said bodies thereby retaining thickness surrounding indents and thicker edges;

said top, center, vertical indent body merges with a connector body that receives a ball connector base.

* * * * *